United States Patent Office 3,274,071
Patented Sept. 20, 1966

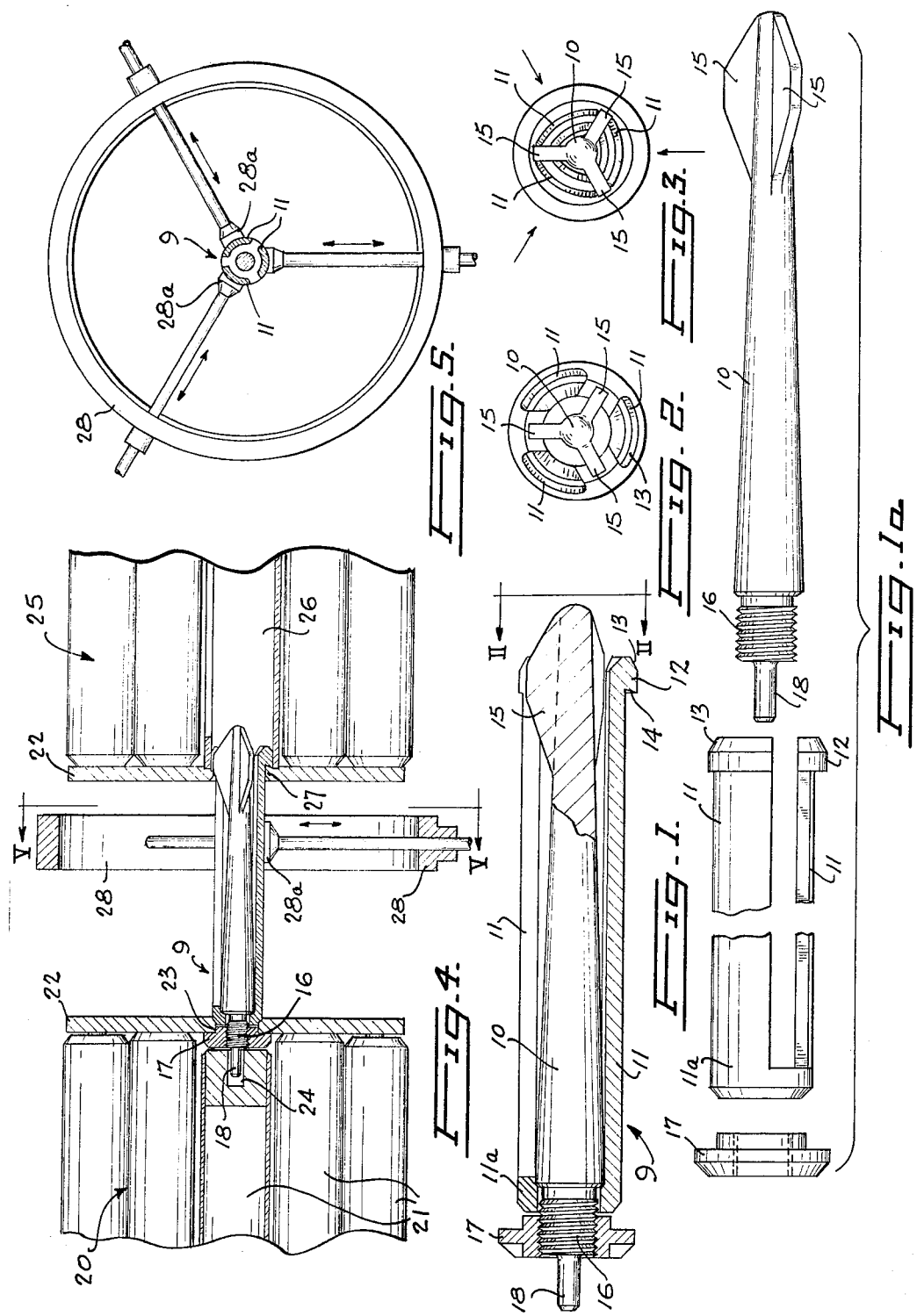

3,274,071
LATCH DEVICE FOR NUCLEAR FUEL
Stanislaw A. Janusz and John Pawliw, Peterborough, Ontario, Canada, assignors to Atomic Energy of Canada Limited, Ontario, Canada
Filed Sept. 30, 1964, Ser. No. 400,512
3 Claims. (Cl. 176—77)

This invention relates to improvements in latch devices for releasably connecting end-to-end the sections of a fuel rod assembly of the type employed in nuclear reactors. To improve overall utilization of the fuel in a nuclear reactor, it is advantageous to divide each fuel rod into several separate sections. The individual sections can then be manipulated so that each receives maximum exposure to the neutron flux, the flux being greatest in the middle of the reactor and lowest at its sides, such sides corresponding in location to the ends of the tubes in which the fuel rods are placed.

This manipulation of fuel sections is conventional and is achieved by so-called "inversion" of the sections. After partial irradiation of the fuel in a first assembled configuration, the assembly is dismantled and reassembled in a different configuration, thus moving the fuel sections which had previously been subjected to only low irradiation to the middle of the reactor to expose them to the higher neutron flux. To carry out this reorientation of the arrangement of the fuel sections, each assembled rod of sections must be withdrawn from the reactor. Nevertheless, the work must be carried out behind shielding by remote operation, since the fuel will have been irradiated.

There is a need for a simple and reliable latch mechanism for connecting the fuel sections of such an assembly to each other in a releasable manner, such latch mechanism requiring the properties of high reliability in the severe environment of the reactor core (intense radiation and high temperature), a small neutron absorption, and relative ease of operation by remote control mechanisms.

The object of the present invention is to provide a latch device satisfying these requirements.

One latch device constructed in accordance with the present invention is illustrated in the accompanying drawings. It is to be understood that the drawings show the device by way of example only and that the broad scope of the invention is determined by the appended claims.

In the drawings:
FIGURE 1 is a side view partly in section of a latch device constructed in accordance with the invention;
FIGURE 1a is an exploded view of the FIGURE 1 device;
FIGURE 2 is an end view of the device of FIGURE 1 taken on the line II—II in FIGURE 1;
FIGURE 3 is a view similar to FIGURE 2 but showing the parts in a different position;
FIGURE 4 is a side view, partly in section, of adjacent ends of a pair of fuel sections demonstrating the manner of use of the device of FIGURES 1 to 3; and
FIGURE 5 is a view on the line V—V in FIGURE 4.

The latch device 9 shown in FIGURES 1 to 3 consists of a central spindle 10 surrounded by a group of three resilient collet fingers 11 each terminating at its free end in a flange 12 having an inclined outwardly facing arcuate surface 13 and a latch shoulder 14. Immediately inwardly of the collet flanges 12 the spindle 10 is formed with three fins 15 which act as support surfaces for the collet fingers 11 when the latter are compressed from their normal FIGURE 2 positions to the positions shown in FIGURE 3. The collet fingers 11 extend from a base portion 11a which is secured to the spindle 10 adjacent a portion 16 thereof which is threaded to receive a nut 17. The portion 16 terminates in an alignment pin 18.

In FIGURE 4, the latch device 9 is shown attached to one end of a first fuel section 20 composed of a series of fuel bars 21 secured to an end support member 22 by the nut 17 threaded on the end portion 16 behind a portion 23 of the support member 22. The pin 18 enters a guiding cavity 24 in the central fuel bar.

In use, the latch device 9 can be connected to an adjacent fuel section 25 by being inserted into a cylindrical cavity 26 formed at one end of the fuel section, the cavity 26 having an annular lip 27 which, when the parts are engaged, cooperates with the shoulders 14 to lock the parts against separation and hence interconnect the fuel sections. The collet fingers 11 move to the locking position due to their inherent resilience, surfaces 13 serving to spring the fingers 11 inwards as they pass the lip 27 during inward motion. It will be observed that fuel sections 20 and 25 can be moved apart approximately the length of the device 9, that is until the lip 27 and shoulders 14 engage, after which tension can be transmitted from section to section so that withdrawal of one of the fuel sections from a reactor tube will cause the other section to follow. When the fuel sections are pushed together the end members 22 abut one another with the device 9 entering the cavity 26.

When it is desired to release one fuel section from the next, the assembly is mounted in an unlatching mechanism 28 (not fully shown) which includes three retractable jaws 28a that can be brought together to compress the collet fingers 11 and thus release the latching engagement of the shoulders 14 with the lip 27.

The fins 15 on the spindle 10 serve to limit the inward deflection of the collet fingers 11 during this time, as demonstrated in FIGURE 3. The spindle 10 also helps guide the relatively delicate collet fingers into the cavity of the next fuel section during latching together of the sections, and protects the collet fingers against damage when individual fuel sections and individual latch devices are being handled.

We claim:
1. A latch device for releasably connecting end-to-end fuel sections of a fuel rod assembly of a nuclear reactor, comprising an elongated spindle having a base portion, a plurality of collet fingers projecting from said base portion in parallel relation surrounding said spindle, means for mounting said base portion on an end of a first fuel section to project axially therefrom, said fingers having outwardly facing latching flanges on their free ends for engagement with an inwardly projecting lip surrounding a cavity in an end of a second fuel section, said fingers being mounted for radially inward resilient compression for release of said flanges from said lip.

2. The combination of a pair of fuel sections of a fuel rod assembly of a nuclear reactor and an elongated latch device for releasably interconnecting said fuel sections end-to-end, each said fuel section having an end support member and one of said fuel sections having in one of its ends a cavity sufficiently large to receive said latch device, a radially inwardly projecting annular lip surrounding the mouth of said cavity, said latch device comprising an elongated spindle having a base portion, a plurality of resilient collet fingers projecting from said base portion in parallel relation surrounding said spindle, and means for mounting said base portion on an end of the other of said fuel sections to project axially therefrom, said fingers having outwardly facing latching flanges on their free ends for engagement with said lip, said fingers being mounted for spring compression radially inwardly to release said flanges from said lip with said spindle limiting such radially inward compression of said collet fingers.

3. The combination of claim 2 wherein said spindle includes a plurality of fins located at the end of the device remote from said base portion, said fins defining supporting surfaces for limiting inward compression of said collet fingers.

No references cited.

BENJAMIN R. PADGETT, *Acting Primary Examiner.*

LEON D. ROSDOL, *Examiner.*

M. J. SCOLNICK, *Assistant Examiner.*